US012621439B2

(12) United States Patent
Kalva et al.

(10) Patent No.: US 12,621,439 B2
(45) Date of Patent: May 5, 2026

(54) SYSTEMS AND METHODS FOR ENCODING AND DECODING VIDEO WITH MEMORY-EFFICIENT PREDICTION MODE SELECTION

(71) Applicant: OP Solutions, LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 18/400,298

(22) Filed: Dec. 29, 2023

(65) Prior Publication Data

US 2024/0137502 A1 Apr. 25, 2024

Related U.S. Application Data

(63) Continuation of application No. PCT/US2022/035647, filed on Jun. 30, 2022.
(Continued)

(51) Int. Cl.
*H04N 19/11* (2014.01)
*H04N 19/127* (2014.01)
(Continued)

(52) U.S. Cl.
CPC ........... *H04N 19/11* (2014.11); *H04N 19/127* (2014.11); *H04N 19/136* (2014.11);
(Continued)

(58) Field of Classification Search
CPC .... H04N 19/11; H04N 19/127; H04N 19/136; H04N 19/156; H04N 19/159; H04N 19/172; H04N 19/423; H04N 19/463
See application file for complete search history.

(56) References Cited

U.S. PATENT DOCUMENTS 7,363,450 B1 * 4/2008 Fedorova ............ G06F 11/3447
711/167
7,457,931 B1 * 11/2008 Fedorova ............ G06F 11/3419
711/147
(Continued)

FOREIGN PATENT DOCUMENTS

CN 1794816 * 12/2005
KR 20140093168 * 11/2012
(Continued)

OTHER PUBLICATIONS

Ando translation of WO 2012081193 Dec. 5, 2011 (Year: 2011).*
(Continued)

*Primary Examiner* — Zaihan Jiang
(74) *Attorney, Agent, or Firm* — OP Solutions IP Department; Paul Ackerman

(57) ABSTRACT

A method of memory-efficient prediction mode selection includes receiving, by an encoder, a coded bitstream including a current frame, determining, by the encoder, costs of a first prediction mode and a second prediction mode, wherein determining further comprises determining, for the first prediction mode, a first bit cost and a first memory cost and determining, for the second prediction mode, a second bit cost and a second memory cost, selecting, by the encoder, a current prediction mode of the first prediction mode and the second prediction mode as a function of the first bit cost, first memory cost, second bit cost, and second memory cost, and encoding, by the encoder, the current frame using the current prediction mode. The prediction mode may be informed by at least one parameter received from the decoder.

11 Claims, 7 Drawing Sheets

400

Receiving an Input Video — 405

Determining Costs of a First and Second Prediction Mode — 410

Selecting a Current Prediction Mode — 415

Encoding the Current Frame — 420

Related U.S. Application Data

(60) Provisional application No. 63/218,732, filed on Jul. 6, 2021.

(51) Int. Cl.

| | |
|---|---|
| *H04N 19/136* | (2014.01) |
| *H04N 19/156* | (2014.01) |
| *H04N 19/159* | (2014.01) |
| *H04N 19/172* | (2014.01) |
| *H04N 19/423* | (2014.01) |
| *H04N 19/463* | (2014.01) |

(52) U.S. Cl.

CPC ......... *H04N 19/156* (2014.11); *H04N 19/159* (2014.11); *H04N 19/172* (2014.11); *H04N 19/423* (2014.11); *H04N 19/463* (2014.11)

(56) References Cited

U.S. PATENT DOCUMENTS

| | | | | |
|---|---|---|---|---|
| 9,152,468 | B2 * | 10/2015 | Waddington | .......... G06F 9/5061 |
| 9,819,942 | B2 * | 11/2017 | Jeong | ..................... H04N 19/13 |
| 2006/0179334 | A1 * | 8/2006 | Brittain | ................... G06F 1/206 |
| | | | | 713/320 |
| 2009/0265500 | A1 * | 10/2009 | Kyusojin | ............ G06F 13/1657 |
| | | | | 719/321 |

FOREIGN PATENT DOCUMENTS

| | | | |
|---|---|---|---|
| WO | WO-0122213 | * | 9/2000 |
| WO | WO-2012081193 | * | 12/2011 |

OTHER PUBLICATIONS

Watanabe translation of CN 1794816 Dec. 22, 2005 (Year: 2005).*
Tsukagoshi translation of KR 20140093168 Nov. 5, 2012 (Year: 2012).*

* cited by examiner

SYSTEMS AND METHODS FOR ENCODING AND DECODING VIDEO WITH MEMORY-EFFICIENT PREDICTION MODE SELECTION

CROSS-REFERENCE TO RELATED APPLICATIONS

This application is a continuation of international application PCT/US22/35647 filed on Jun. 30, 2022, and entitled SYSTEMS AND METHODS FOR ENCODING AND DECODING VIDEO WITH MEMORY-EFFICIENT PREDICTION MODE SELECTION, which application claims the benefit of priority of U.S. Provisional Application, Ser. No. 63/218,732, filed on Jul. 6, 2021, and entitled SYSTEMS AND METHODS FOR MEMORY-EFFICIENT PREDICTION MODE SELECTION, each of which is incorporated herein by reference in its entirety.

FIELD OF THE INVENTION

The present invention generally relates to the field of video encoding and decoding. In particular, the present invention is directed to systems and methods for organizing and searching a video database.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

A video encoder is provided that is configured with memory-efficient prediction mode selection. The encoder includes a processor programmed to perform the encoding operations. The encoder is configured to receive an input video including a current frame. The encoder determines costs of a first prediction mode and a second prediction mode. Preferably, the determining operation can further comprise determining, for the first prediction mode, a first bit cost and a first memory cost and determining, for the second prediction mode, a second bit cost and a second memory cost. The encoder selects a current prediction mode of the first prediction mode and the second prediction mode as a function of the first bit cost, first memory cost, second bit cost, and second memory cost. The current frame can be encoded using the current prediction mode.

In some embodiments, determining the first memory cost can further comprise retrieving a stored value representing the first memory cost. Similarly, in certain embodiments, determining the second memory cost further comprises retrieving a stored value representing the second memory cost. In still other embodiments, determining the first memory cost may further comprise receiving processor architecture data from a decoder and determining the first memory cost from the processor architecture data. In further embodiments, determining the second memory cost can further comprise receiving processor architecture data from a decoder, and determining the second memory cost from the processor architecture data.

In some encoder embodiments, selecting can further comprise determining a threshold value based on the first memory cost and the second memory cost, and selecting as a function of the threshold value. The selecting operation may further comprise comparing a difference between the first bit cost and the second bit cost to the threshold value.

In one encoder embodiment, the first prediction mode is vertical intra prediction and the second prediction mode is horizontal intra prediction.

A video decoder is provided that is configured to operate with an encoder having a memory-efficient prediction mode. The decoder can be configured to provide a signal to the encoder indicating at least one parameter of the decoder. The decoder receives a video signal encoded with at least one of a first prediction mode and a second prediction mode, wherein the prediction mode is determined at the encoder based on at least one of a bit cost and a memory cost determined for the bitstream at least in part based on the at least one parameter of the decoder. The at least one parameter can be processor architecture data of the decoder and the encoder can determine a first memory cost, at least in part, from the processor architecture data. The at least one parameter provided by the decoder may be indicative of a prediction mode that will reduce power consumption at the decoder. In some embodiments, the first prediction mode can be vertical intra prediction and the second prediction mode can be horizontal intra prediction.

The decoder can be capable of decoding a bitstream including encoded video and feature components. The decoder may include a demultiplexor receiving the bitstream and providing an encoded video output stream and an encoded feature component output stream. A first decoding module can be provided to receive the encoded video output stream and decode the video output stream for human consumption. The decoder can include a second decoding module receiving the encoded feature stream and decoding the feature components for machine consumption.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
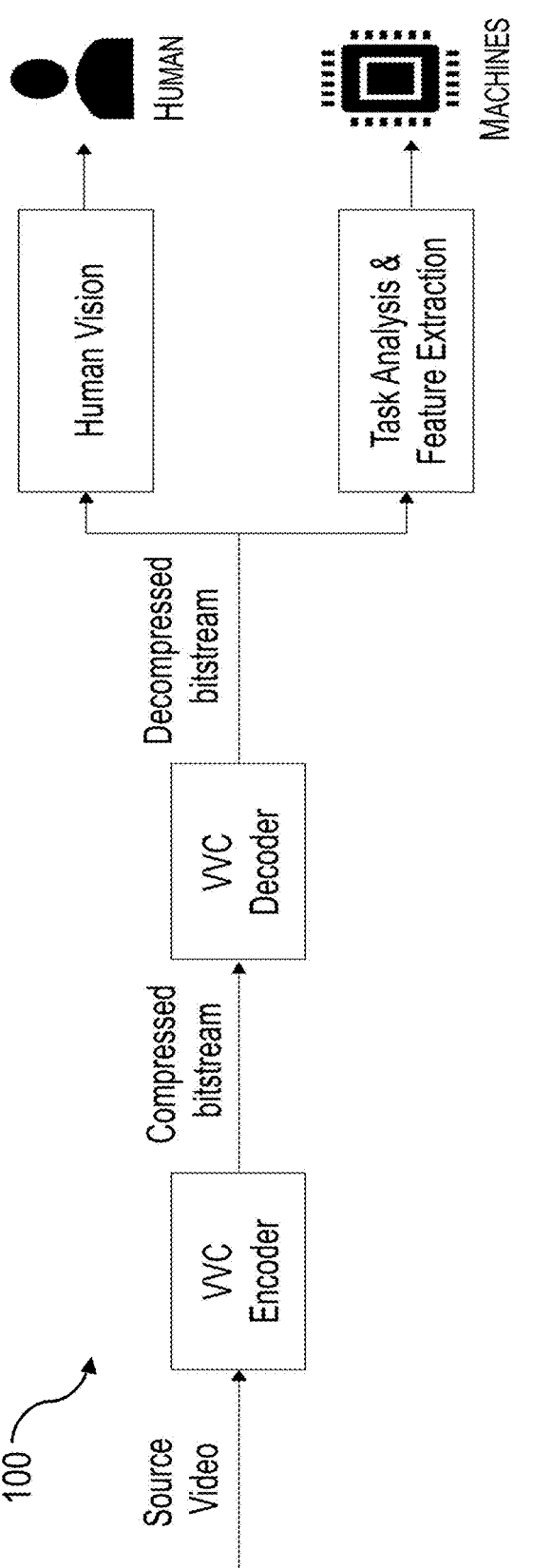
FIG. 1 is a block diagram illustrating an exemplary embodiment of a video coding system.

In many applications, such as surveillance systems with multiple cameras, intelligent transportation, smart city applications, and/or intelligent industry applications, traditional video coding may require compression of large number of videos from cameras and transmission through a network to machines and for human consumption. Subsequently, at a machine site, algorithms for feature extraction may applied typically using convolutional neural networks or deep learning techniques including object detection, event action recognition, pose estimation and others. FIG. 1 shows an exemplary embodiment of a standard VVC coder applied for machines. Conventional approach unfortunately require a massive video transmission from multiple cameras, which may take significant time for efficient and fast real-time analysis and decision-making In embodiments, a VCM approach may resolve this problem by both encoding video and extracting some features at a transmitter site and then transmitting a resultant encoded bit stream to a VCM decoder. At a decoder site video may be decoded for human vision and features may be decoded for machines.

Figure 2:
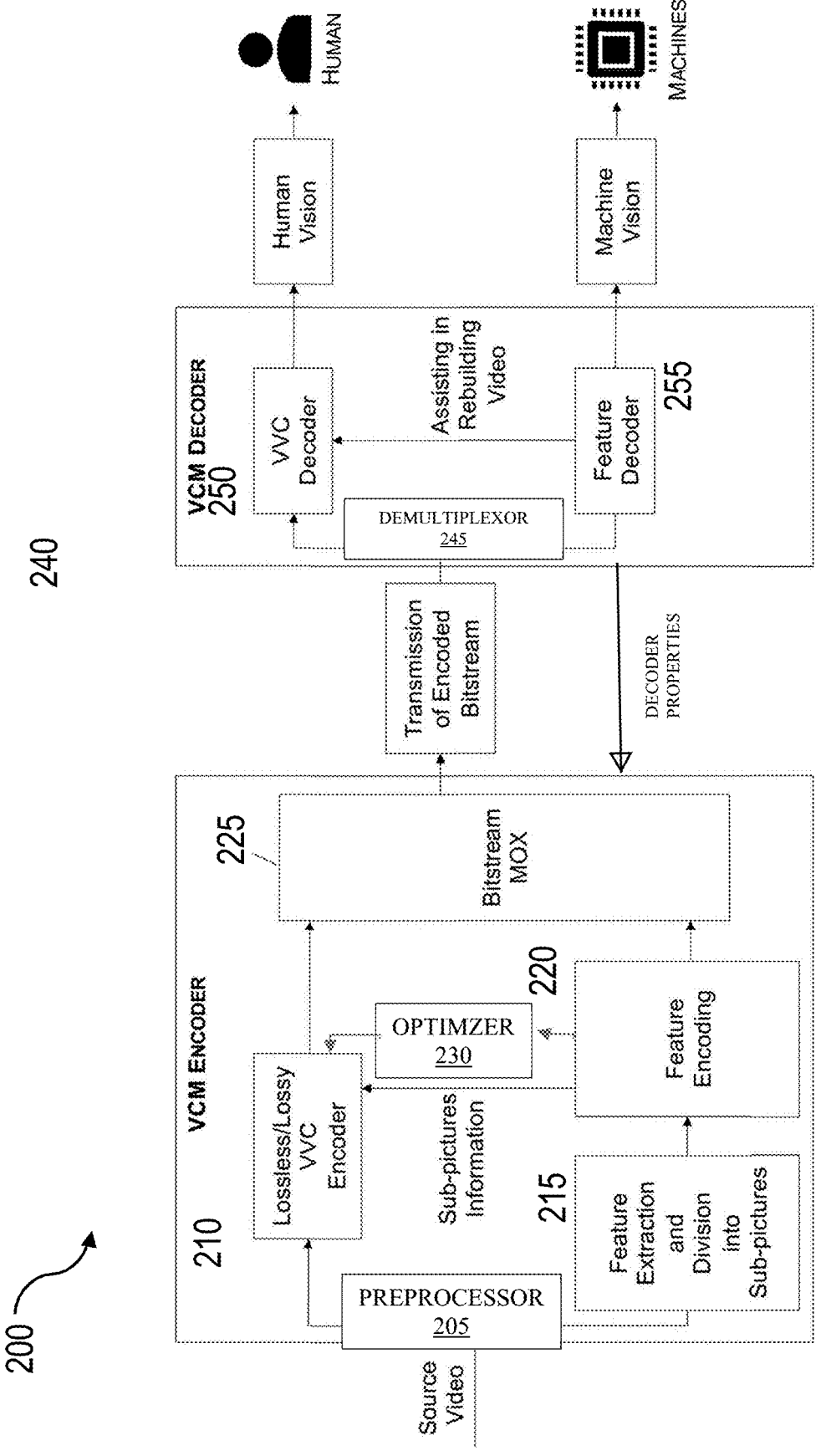
FIG. 2 is a block diagram illustrating an exemplary embodiment of a video coding for machines system.

Referring now to FIG. 2, an exemplary embodiment of a system for video coding for machines (VCM) is illustrated. The system includes a VCM encoder 200 which may be implemented using any circuitry including without limitation digital and/or analog circuitry. VCM encoder 200 may be configured using hardware configuration, software configuration, firmware configuration, and/or any combination thereof. VCM encoder 20 may be implemented as a computing device and/or as a component of a computing device, which may include without limitation any computing device as described below. In an embodiment, VCM encoder 200 may be configured to receive an input video and generate an output bitstream. Reception of an input video may be accomplished in any manner described below. A bitstream may include, without limitation, any bitstream as described below. VCM encoder 210 may include, without limitation, a pre-processor 205, a video encoder 210, a feature extractor 215, a feature encoder 220, an optimizer 230, and/or a multiplexor 225.

Pre-processor 205 may receive input video stream and parse out video, audio and metadata sub-streams of the stream. Pre-processor 205 may include and/or communicate with decoder as described in further detail below; in other words, Pre-processor 205 may have an ability to decode input streams. This may allow, in a non-limiting example, decoding of an input video, which may facilitate downstream pixel-domain analysis.

Further referring to FIG. 2, VCM encoder 200 may operate in a hybrid mode and/or in a video mode; when in the hybrid mode VCM encoder 200 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor.

Still referring to FIG. 2, video encoder 200 may include without limitation any video encoder as described in further detail below. When VCM encoder is in hybrid mode, VCM encoder may send unmodified input video to video encoder and a copy of the same input video, and/or input video that has been modified in some way, to feature extractor. Modifications to input video may include any scaling, transforming, or other modification that may occur to persons skilled in the art upon reviewing the entirety of this disclosure. For instance, and without limitation, input video may be resized to a smaller resolution, a certain number of pictures in a sequence of pictures in input video may be discarded, reducing framerate of the input video, color information may be modified, for example and without limitation by converting an RGB video might be converted to a grayscale video, or the like.

Still referring to FIG. 2, video encoder 210 and feature extractor 215 are preferably operatively coupled and might exchange useful information in both directions. For example, and without limitation, video encoder 210 may transfer motion estimation information to feature extractor 215, and vice-versa. Video encoder 210 may provide Quantization mapping and/or data descriptive thereof based on regions of interest (ROI), which video encoder and/or feature extractor may identify, to feature extractor, or vice-versa. Video encoder may provide to feature extractor data describing one or more partitioning decisions based on features present and/or identified in input video, input signal, and/or any frame and/or subframe thereof; feature extractor may provide to video encoder data describing one or more partitioning decisions based on features present and/or identified in input video, input signal, and/or any frame and/or subframe thereof. Video encoder 210 and feature extractor 215 may share and/or transmit to one another temporal information for optimal group of pictures (GOP) decisions. Each of these techniques and/or processes may be performed, without limitation, as described in further detail below.

With continued reference to FIG. 2, feature extractor 215 may operate in an offline mode or in an online mode. Feature extractor 215 may identify and/or otherwise act on and/or manipulate features. A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor by a remote machine in real time or at some point before extraction.

Still referring to FIG. 2, feature encoder is configured for encoding a feature signal, for instance and without limitation as generated by feature extractor. In an embodiment, after extracting the features feature extractor may pass extracted features to feature encoder. Feature encoder may use entropy coding and/or similar techniques, for instance and without limitation as described below, to produce a feature stream, which may be passed to multiplexor. Video encoder and/or feature encoder may be connected via optimizer 230. Optimizer 230 may exchange useful information between those video encoder 210 and feature encoder 220. For example, and without limitation, information related to codeword construction and/or length for entropy coding may be exchanged and reused, via optimizer, for optimal compression.

In an embodiment, and continuing to refer to FIG. 2, video encoder 210 may produce an encoded video stream; video stream may be passed to multiplexor 225. Multiplexor 225 may multiplex video stream with a feature stream generated by feature encoder; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 200 is in video mode, VCM encoder may use video encoder 210 for both video and feature encoding. Feature extractor 215 may transmit features to video encoder 210. The video encoder 210 may encode features into a video stream that may be decoded by a corresponding video decoder. It should be noted that VCM encoder may use a single video encoder for both video encoding and feature encoding, in which case it may use different set of parameters for video and features. Alternatively, VCM encoder 200 may include two separate video encoders, which may operate in parallel.

Still referring to FIG. 2, system may include and/or communicate with, a VCM decoder 240. VCM decoder 240 and/or elements thereof may be implemented using any circuitry and/or type of configuration suitable for configuration of VCM encoder 200 as described above. VCM decoder 240 may include, without limitation, a demultiplexor 245. Demultiplexor 245 may operate to demultiplex bitstreams if multiplexed as described above; for instance and without limitation, demultiplexor may separate a multiplexed bitstream containing one or more video bitstreams and one or more feature bitstreams into separate video and feature bitstreams.

Continuing to refer to FIG. 2, VCM decoder 240 may include a video decoder 250. Video decoder may be implemented, without limitation, in any manner suitable for a decoder as described in further detail below. In an embodiment, and without limitation, video decoder may generate an output video, which may be viewed by a human or other creature and/or device having visual sensory abilities. Still referring to FIG. 2, VCM decoder may include a feature decoder 255. In an embodiment, and without limitation, feature decoder may be configured to provide one or more decoded data to a machine. Machine(s) may include, without limitation, any computing device as described below, including without limitation any microcontroller, processor, embedded system, system on a chip, network node, or the like. Machine(s) may operate, store, train, receive input from, produce output for, and/or otherwise interact with a machine model as described in further detail below. Machine may be included in an Internet of Things (IoT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash, and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

With continued reference to FIG. 2, each of VCM encoder 200 and/or VCM decoder 240 may be designed and/or configured to perform any method, method step, or sequence of method steps in any embodiment described in this disclosure, in any order and with any degree of repetition. For instance, each of VCM encoder and/or VCM decoder may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder and/or VCM decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, video decoding may be a computer intensive process with high CPU utilization and large number of memory accesses. Complex coding modes in VVC bitstreams may take more computing resources and increase power consumption. In a general computing device, data movement to and/or from memory may be a significant contributor to total power consumed by a video decoding process. Selecting video coding modes at an encoder that improves cache efficiency at a decoder may lead to reduced total power consumed by a video decoding process.

Still referring to FIG. 2, VCM and VVC standards, protocols, and technologies are referred to in this disclosure for exemplary purposes only; any or all embodiments, components, and/or method steps disclosed in this disclosure may be applied to any standard and/or protocol of video storage, transmission, encoding, and/or decoding, or in any other relevant technological arena.

Figure 3:
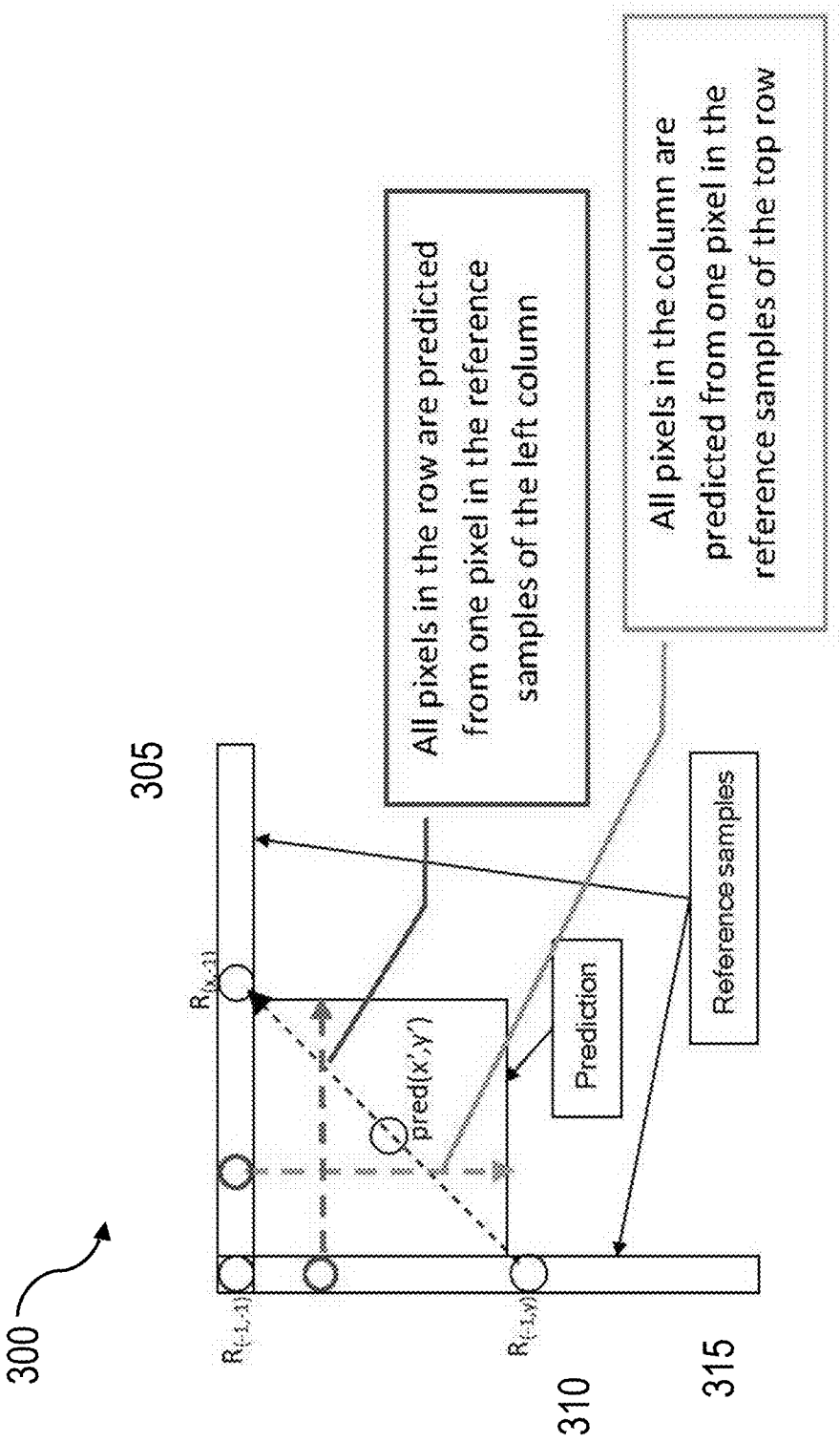
FIG. 3 is a schematic diagram illustrating horizontal and vertical decoding methods.

Referring now to FIG. 3, an exemplary embodiment of a comparison of horizontal intra prediction and vertical intra prediction is illustrated. In horizontal prediction all pixels in a row 305 may be predicted from one pixel 310 in the reference samples of a left column 315. A subsequent row of predicted pixels may use a reference pixel immediately in a row below a previous reference pixels. Given a row-wire memory storage of a reference picture, reading each reference pixel in horizontal prediction may cause a last level cache (LLC) miss and cause a memory access to a cache line.

Reading each subsequent reference pixel may cause an LLC miss and a new cache line read from a main memory. Reading from memory may add to latency and associated bus transactions may cause power consumption, for instance due to switching capacitance, bus transactions, and/or associated power use.

With continued reference to FIG. 3, in vertical prediction all pixels in a column may be predicted from one pixel in reference samples of a top row. A subsequent column of predicted pixels may use a reference pixel immediately in a column next to previous reference pixels. Given row-wire memory storage of a reference picture, reading a first reference pixel in vertical prediction may cause an entire cache line and all reference pixels to be read into a cache. Reading each subsequent reference pixel may be satisfied from a cache hit and without a need to read from main memory.

Vertical prediction may thus be more memory efficient, which may cause much fewer reads from main memory. A power optimizing encoder may thus select vertical prediction over horizontal prediction for the same bitstream size. If may also be beneficial to trade off bitrate, and/or output bitstream size, for power efficiency. For example, an encoder may choose vertical prediction over horizontal prediction even when a bit cost of horizontal prediction is lower in order to produce a more cache and power efficient bit stream and enable low power decoders. For instance, where B(Pv) is a bit cost of vertical prediction, and B(Ph) is a bit cost of horizontal prediction, encoder may determine and/or use Bt, threshold bit cost for selecting vertical prediction. In that case, if (B(Pv)<B(Ph)), then encoder may select vertical prediction. In an embodiment, if (B(Pv)>B(Ph) and if (B(Pv)−B(Ph)<Bt), then encoder may select vertical prediction; otherwise, encoder may select horizontal prediction.

In general, and still referring to FIG. 3, vertical prediction may be memory and power efficient and may be preferred over other modes. In general, encoder may be configured to find a lowest cost mode and then compare to vertical intra prediction mode. For instance, and without limitation, where B(Pv) represents a bit cost of vertical prediction, B(Pm) represents a bit cost of lowest cost prediction mode obtained after evaluating available modes, and Bt represents a threshold bit cost for selecting vertical prediction, encoder may compare such values. As an example, if (B(Pv)<B(Pm), then encoder may select vertical prediction. If (B(Pv)>B(Pm), if (B(Pv)−B(Pm)<B(t), then encoder may select vertical prediction; otherwise, encoder may select a lowest cost prediction mode Pm.

Continuing to refer to FIG. 3, cache efficiency may depend on a processor architecture. Encoders may optimize power based on input from a decoder. For example, in a video conferencing type application, a decoder and/or receiver may share its processor, memory, and/or power consumption information with an encoder. The encoder may then make encoding decisions that minimize memory reads at the decoder. When a specific decoder architecture information is not available, encoders may encode for a typical processor and still produce power efficient bitstreams.

For instance, and still referring to FIG. 3, for a coding mode m, C(m) may represent memory cost of using that mode. In this example, C(m) may represent a number of cache lines read from main memory at a decoder as a result of using mode m, a cache miss rate at a given cache level, a weighted sum of cache miss rates at different levels, weighted by efficiency and/or tier of caches missed, or the like. In an embodiment, M may represent a set of all available coding modes that may be used in a given compressed video bitstream. Modes may include, without limitation, inter or intra prediction modes. Modes may also include other coding modes such as block partitioning, motion vector modes, and/or merge modes. Persons skilled in the art, upon reviewing the entirety of this disclosure, will be aware of various encoding and/or decoding modes that may be considered.

In an embodiment, for a given processor and/or memory architecture, an encoder may compute memory cost of mode i, C(i), where i represents an index of one of available modes M. These mode costs may be independent of content and computed once. B(i) may represent a bit cost of using mode i. In an embodiment, for modes i and j in a set of available modes M, if (B(i)<B(j), and if (C(i)<C(j) encoder may select mode i. Alternatively, if (B(i)<B(j), and if (C(i)>C(j) encoder may determine if (B(i)−B(j)<Bt), where Bt is a threshold for bit cost and if so, encoder may select mode I; otherwise encoder may select mode j. As a further example, if (B(i)>B(j), encoder may determine if (C(i)−C(j)<Ct), where Ct is the threshold for memory access for the given architecture; if so, encoder may select mode i; otherwise, encoder may select mode j.

Still referring to FIG. 3, identify mode versus memory efficiency for other coding modes may be determined, and an encoder may select a mode that reduces memory accesses and reduces power consumption.

Figure 4:
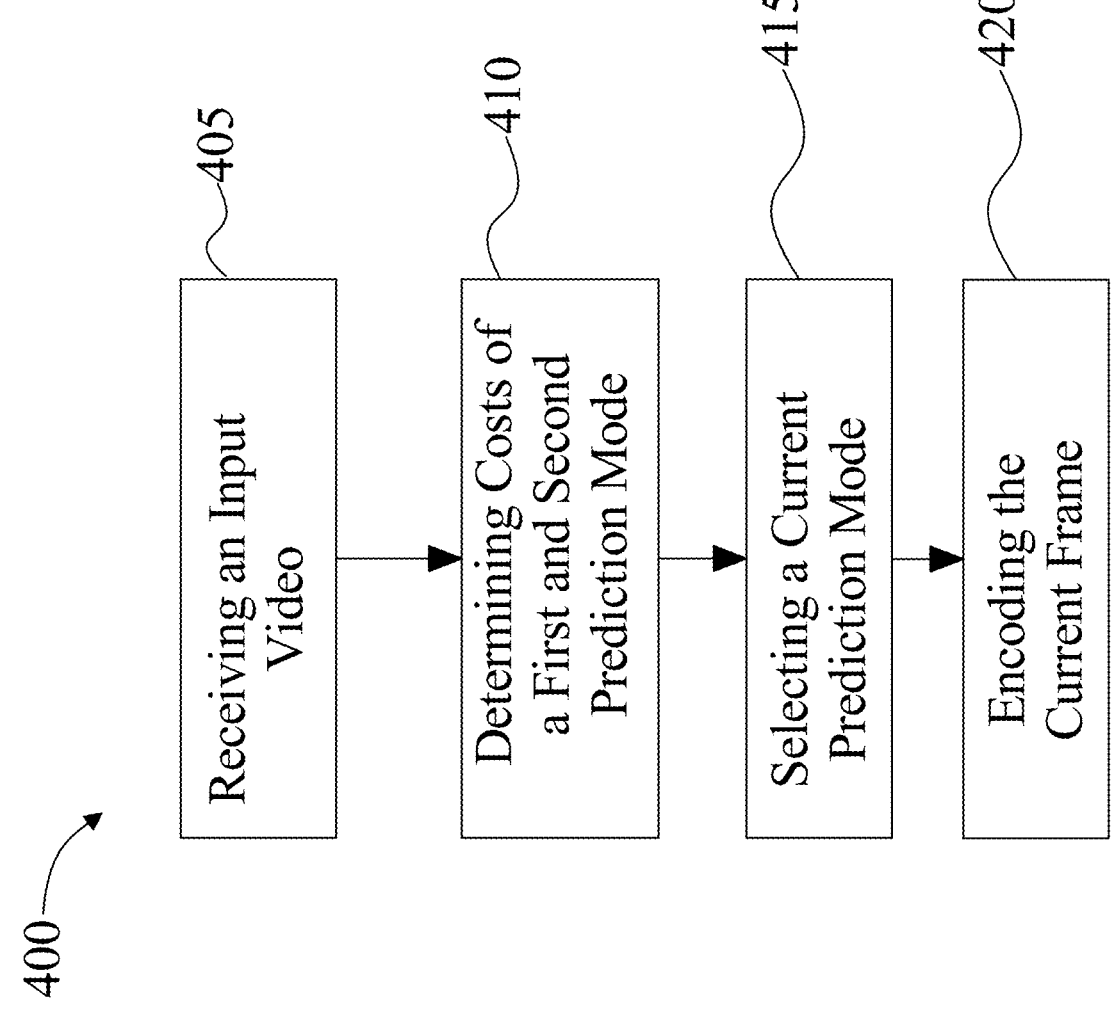
FIG. 4 is a flow diagram illustrating an exemplary embodiment of a method of memory-efficient prediction mode selection.

Referring now to FIG. 4, an exemplary embodiment of a method 400 of memory-efficient prediction mode selection is illustrated. At step 405, an encoder receives an input video including a current frame.

Still referring to FIG. 4, at step 410, encoder determines costs of a first prediction mode and a second prediction mode; this may be performed without limitation in any manner described in this disclosure. Determining costs may include, without limitation, determining, for a first prediction mode, a first bit cost and/or a first memory cost, and/or determining, for second prediction mode, a second bit cost and/or a second memory cost. In an embodiment, determining a first memory cost may include retrieving a stored value representing the first memory cost. Determining a second memory cost may include retrieving a stored value representing the second memory cost.

Determining a first memory cost may include receiving processor architecture data from a decoder and determining the first memory cost from the processor architecture data. Determining a second memory cost may include receiving processor architecture data from a decoder and determining the second memory cost from the processor architecture data.

At step 415, and further referring to FIG. 4, encoder selects a current prediction mode of the first prediction mode and the second prediction mode as a function of the first bit cost, first memory cost, second bit cost, and second memory cost; this may be performed, without limitation, as described in further detail below. At step 420, and still referring to FIG. 4, encoder encodes current frame using current prediction mode.

Figure 5:
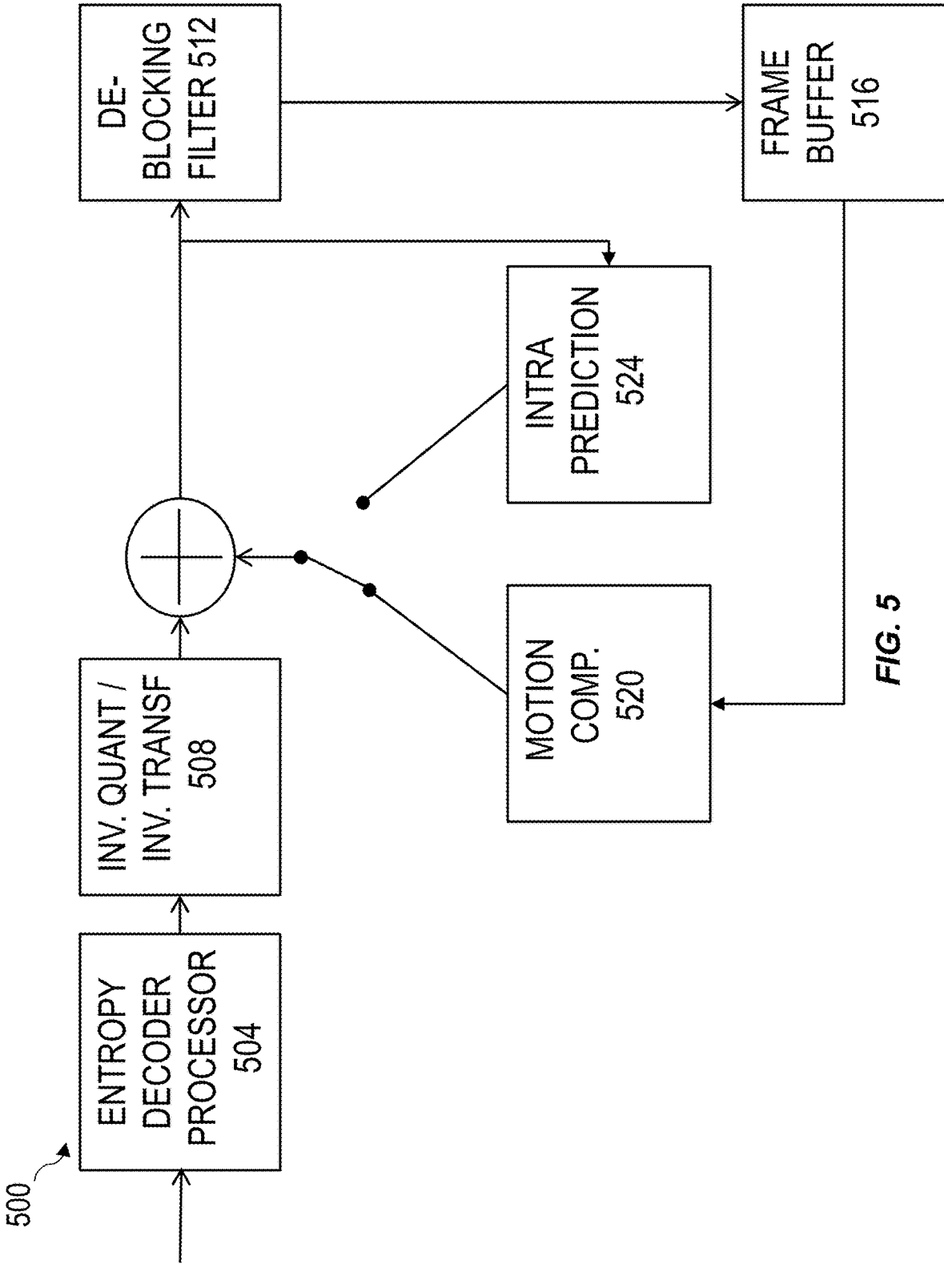
FIG. 5 is a block diagram illustrating an exemplary embodiment of a video decoder.

FIG. 5 is a system block diagram illustrating an example decoder 500. Decoder 500 may include an entropy decoder processor 504, an inverse quantization and inverse transformation processor 508, a deblocking filter 512, a frame buffer 516, a motion compensation processor 520 and/or an intra prediction processor 524.

In operation, and still referring to FIG. 5, bit stream 528 may be received by decoder 500 and input to entropy decoder processor 504, which may entropy decode portions of bit stream into quantized coefficients. Quantized coefficients may be provided to inverse quantization and inverse transformation processor 508, which may perform inverse quantization and inverse transformation to create a residual signal, which may be added to an output of motion compensation processor 520 or intra prediction processor 524 according to a processing mode. An output of the motion compensation processor 520 and intra prediction processor 524 may include a block prediction based on a previously decoded block. A sum of prediction and residual may be processed by deblocking filter 512 and stored in a frame buffer 516.

In an embodiment, and still referring to FIG. 5, decoder 500 may include circuitry configured to implement any operations as described above in any embodiment as described above, in any order and with any degree of repetition. For instance, decoder 500 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
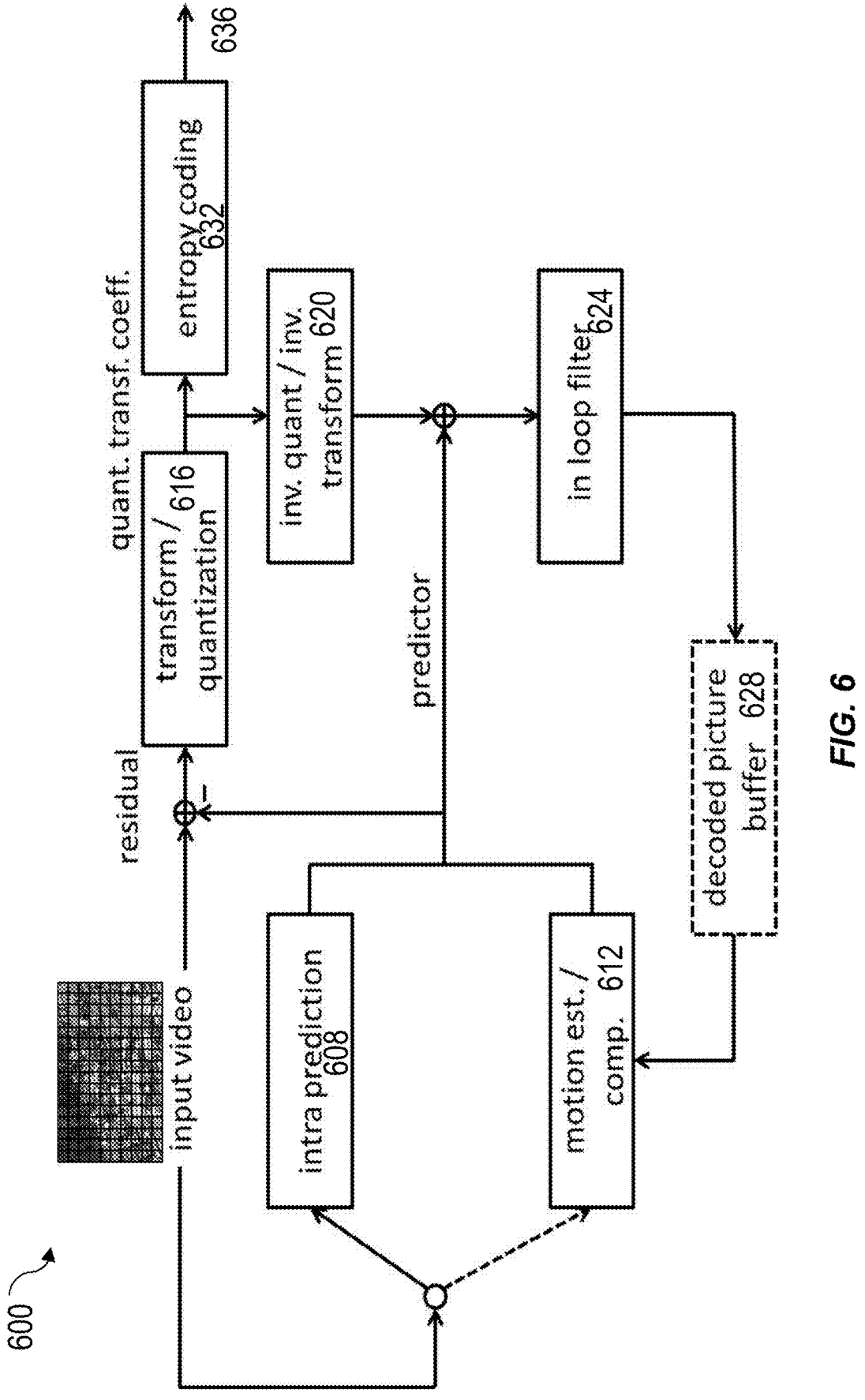
FIG. 6 is a block diagram illustrating an exemplary embodiment of a video encoder.

FIG. 6 is a system block diagram illustrating an example encoder 600 capable of video and/or feature encoding. Example video encoder 600 may receive an input video 604, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 6, example video encoder 600 may include an intra prediction processor 608, a motion estimation/compensation processor 612, which may also be referred to as an inter prediction processor, capable of constructing a motion vector candidate list including adding a global motion vector candidate to the motion vector candidate list, a transform/quantization processor 616, an inverse quantization/inverse transform processor 620, an in-loop filter 624, a decoded picture buffer 628, and/or an entropy coding processor 632. Bit stream parameters may be input to the entropy coding processor 632 for inclusion in the output bit stream 636.

In operation, and with continued reference to FIG. 6, for each block of a frame of input video, whether to process block via intra picture prediction or using motion estimation/compensation may be determined. Block may be provided to intra prediction processor 608 or motion estimation/compensation processor 612. If block is to be processed via intra prediction, intra prediction processor 608 may perform processing to output a predictor. If block is to be processed via motion estimation/compensation, motion estimation/compensation processor 612 may perform processing including constructing a motion vector candidate list including adding a global motion vector candidate to the motion vector candidate list, if applicable.

Further referring to FIG. 6, a residual may be formed by subtracting a predictor from input video. Residual may be received by transform/quantization processor 616, which may perform transformation processing (e.g., discrete cosine transform (DCT)) to produce coefficients, which may be quantized. Quantized coefficients and any associated signaling information may be provided to entropy coding processor 632 for entropy encoding and inclusion in output bit stream 636. Entropy encoding processor 632 may support encoding of signaling information related to encoding a current block. In addition, quantized coefficients may be provided to inverse quantization/inverse transformation processor 620, which may reproduce pixels, which may be combined with a predictor and processed by in loop filter 624, an output of which may be stored in decoded picture buffer 628 for use by motion estimation/compensation processor 612 that is capable of constructing a motion vector candidate list including adding a global motion vector candidate to the motion vector candidate list.

With continued reference to FIG. 6, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 6, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 6, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 6, encoder 600 may include circuitry configured to implement any operations as described above in any embodiment, in any order and with any degree of repetition. For instance, encoder 600 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 600 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 6, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 600 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
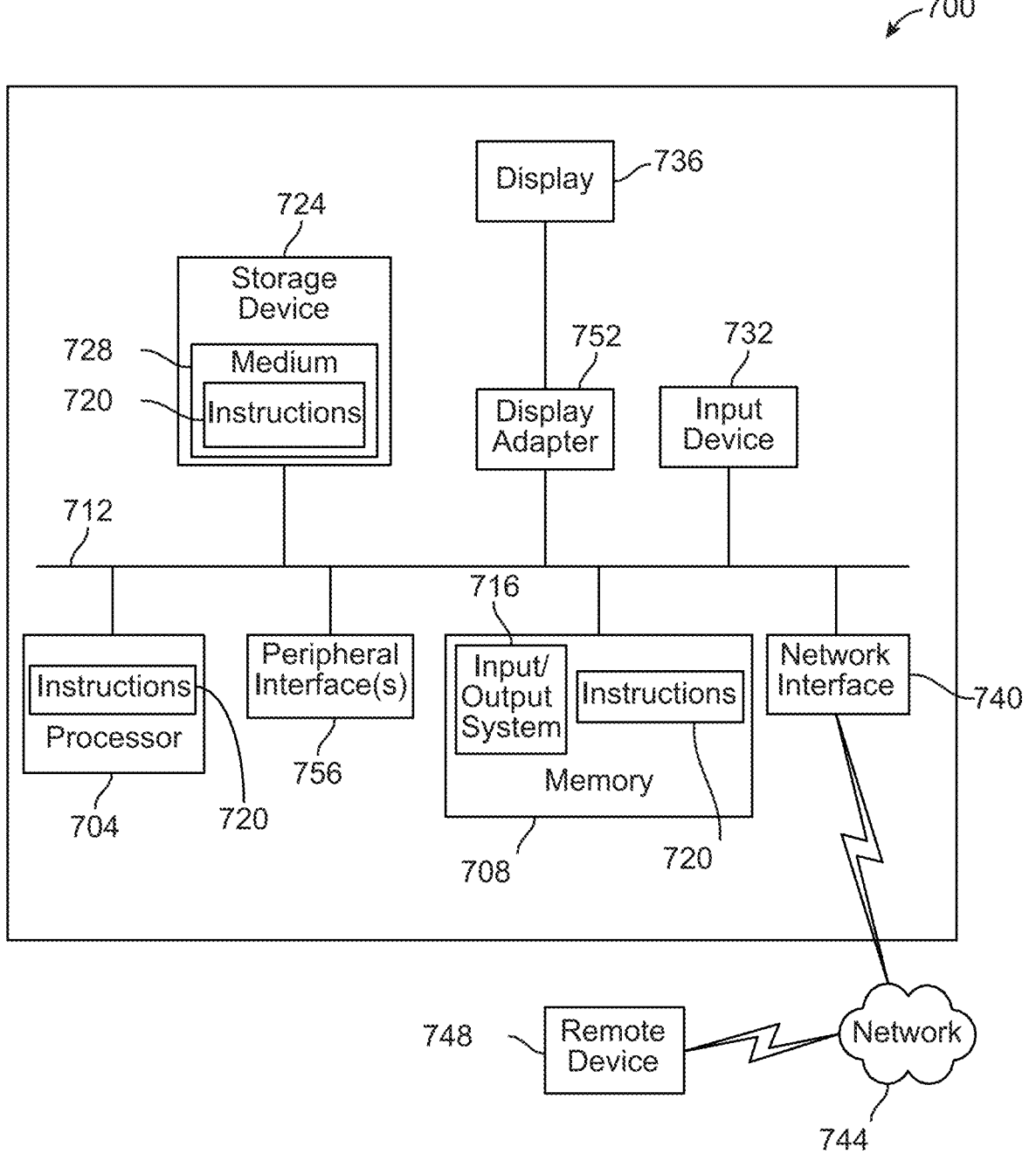
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC) Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof.

Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of encoding features of a video signal in a system for machine video consumption comprising:

receiving an input video signal;

performing feature extraction on the received input video signal to generate a feature signal comprising a least one feature in a current video frame;

determining costs of a first prediction mode and a second prediction mode, wherein determining further comprises:

determining, for the first prediction mode, a first bit cost and a first memory cost associated with encoding the feature signal; and determining, for the second prediction mode, a second bit cost and a second memory cost associated with encoding the feature signal;

selecting a current prediction mode of the first prediction mode and the second prediction mode as a function of the first bit cost, first memory cost, second bit cost, and second memory cost; and encoding the feature signal of the current frame using the current prediction mode.

2. The encoding method of claim 1, wherein determining the first memory cost further comprises retrieving a stored value representing the first memory cost.

3. The encoding method of claim 1, wherein determining the second memory cost further comprises retrieving a stored value representing the second memory cost.

4. The encoding method of claim 1, wherein determining the first memory cost further comprises receiving processor architecture data from a decoder, and determining the first memory cost from the processor architecture data.

5. The encoding method of claim 1, wherein determining the second memory cost further comprises receiving processor architecture data from a decoder, and determining the second memory cost from the processor architecture data.

6. The encoding method of claim 1, wherein selecting further comprises determining a threshold value based on the first memory cost and the second memory cost, and selecting as a function of the threshold value.

7. The encoding method of claim 6, wherein selecting further comprises comparing a difference between the first bit cost and the second bit cost to the threshold value.

8. The encoding method of claim 1, wherein the first prediction mode is vertical intra prediction and the second prediction mode is horizontal intra prediction.

9. The encoding method of claim 8, wherein selecting a current prediction mode includes determining a difference in bit cost between vertical intra prediction and horizontal intra prediction and selecting vertical intra prediction when the difference is less than a predetermined threshold value.

10. The encoding method of claim 1, wherein feature extraction is performed using a partial convolutional neural network trained using a machine model for a machine task performed at a decoder site.

11. The encoding method of claim 10, wherein encoding the feature signal is performed using a VVC compliant encoding method.

*    *    *    *    *